United States Patent [19]

Berg

[11] Patent Number: 5,103,743

[45] Date of Patent: Apr. 14, 1992

[54] METHOD AND APPARATUS FOR DRYING SOLID MATERIAL

[75] Inventor: Eero J. Berg, Oulu, Finland

[73] Assignee: A. Ahlstrom Corporation, Karhula, Finland

[21] Appl. No.: 469,531

[22] PCT Filed: Sep. 19, 1988

[86] PCT No.: PCT/FI88/00150

§ 371 Date: Mar. 15, 1990

§ 102(e) Date: Mar. 15, 1990

[87] PCT Pub. No.: WO89/02568

PCT Pub. Date: Mar. 23, 1989

[30] Foreign Application Priority Data

Sep. 21, 1987 [FI] Finland .................. 874096

[51] Int. Cl.$^5$ .................. B23K 3/02
[52] U.S. Cl. .................. 110/226; 110/246; 432/107; 432/112
[58] Field of Search .................. 34/109, 128, 136, 137, 34/35; 432/112, 107, 109, 111, 113, 31; 110/246, 224, 226, 227

[56] References Cited

U.S. PATENT DOCUMENTS 3,787,292  1/1974  Keappler .................. 432/107 X
4,376,343  3/1983  White et al. .................. 34/136 X

FOREIGN PATENT DOCUMENTS 818169  8/1951  Fed. Rep. of Germany .

Primary Examiner—Henry Bennett
Attorney, Agent, or Firm—Nixon & Vanderhye

[57] ABSTRACT

A method and apparatus for drying solids such as bark, peat, wet coal or the like utilizes waste heat recovered from a rotary kiln. Solids are dried by simultaneously using both the radiation heat of the shell surface of the kiln and the heat of hot flue gases being discharged from the kiln. The solids are dried in a drying space which is defined by the shell surface of the rotary kiln and a jacket surrounding at least part of the shell surface of the kiln. Flue gases from the rotary kiln are passed with solids through the drying space. The kiln may be used for combusting lime.

20 Claims, 1 Drawing Sheet

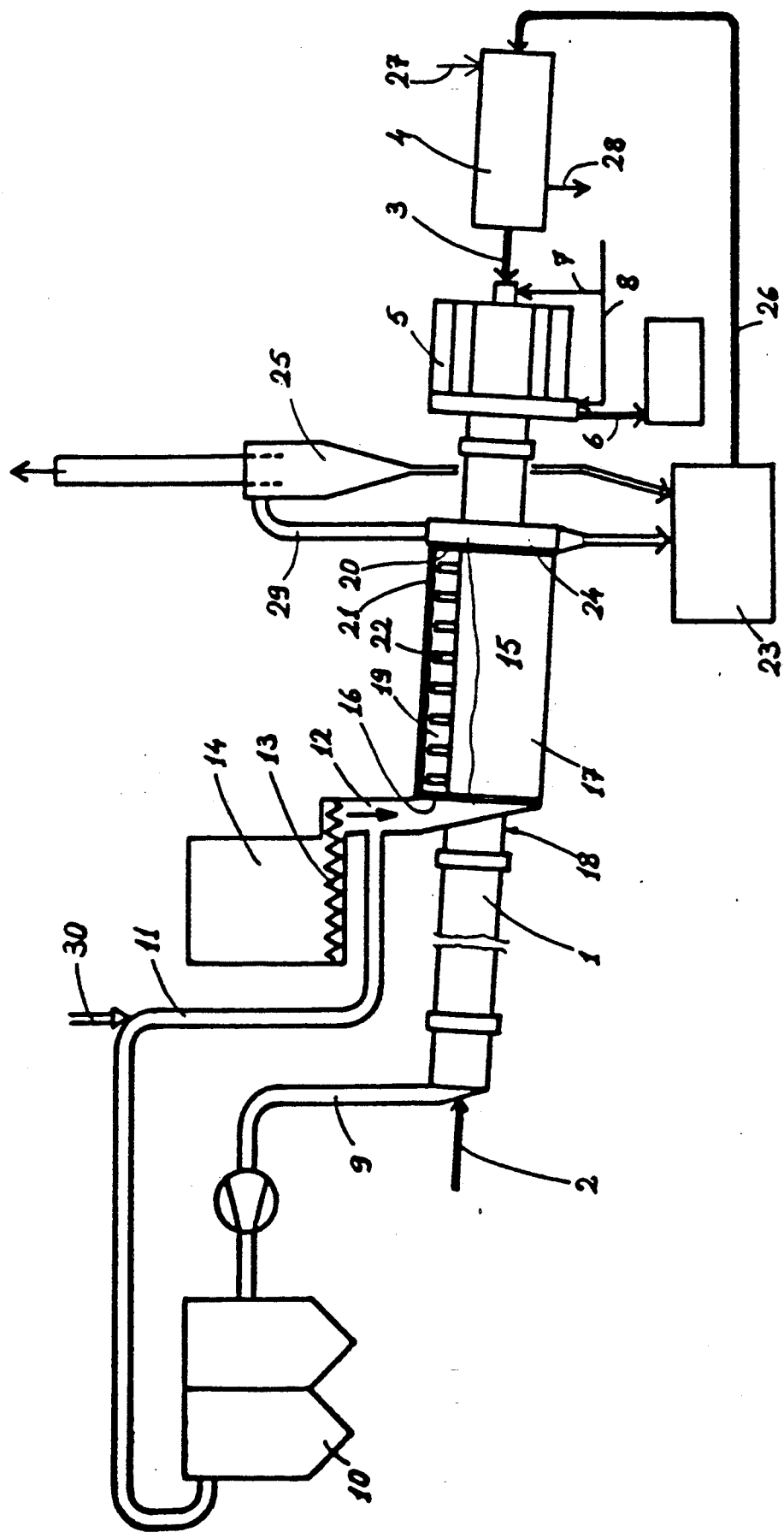

METHOD AND APPARATUS FOR DRYING SOLID MATERIAL

The present invention relates to a method and apparatus for drying solid material with waste heat generated in processes in which materials are treated at a high temperature in a rotary kiln the jacket of which is hot and wherefrom hot gases are discharged in addition to the treated material.

The present invention is especially suitable for utilization of waste heat of lime kilns in the pulp industry. The method of the invention can, however, utilize waste heat from other burning processes as well, such as lime burning, in which materials are heat treated at a high temperature in a rotary kiln and in which hot exhaust gases are produced.

Lime kilns are long, rotary drum combustors in which lime mud, separated in connection with the causticizing processes in the pulp industry and mainly consisting of $CaCo_3$, is regenerated for combustion. $CaCO_3$ decomposes in combustion according to the reaction $CaCO_3 \text{---} CaO + CO_2$.

Theoretically, $CaCO_3$ decomposes at a temperature as low as about 900° C., but in order to reach decomposition rates high enough, it is combusted at about 1100° C. and in short rotary kilns at about 1300° C. Lime mud is fed cold at a dry solids content of about 60-65% from the lime mud filter into the rotary kiln. Hot flue gases produced at the opposite end of the kiln are conducted against the lime mud flow. In long kilns, the combustion time may be about 4 hours, whereby the evaporation of the water contained in the lime mud, production of lime mud grains, heating and combustion take place slowly yielding a good result. The temperature of the outlet lime is normally about 1200°-1400° C.

Heavy fuel oil or in some cases natural gas is used in heating up the lime kiln. In modern lime kilns, equipped with coolers for burnt lime, heat consumption is about 1800 Mcal per burnt lime ton the dry solids content of lime mud being 60% in combustion. Due to high energy costs, there are continuous efforts to improve the energy economy of the pulp industry. Lime kilns are equipped with flue gas scrubbers in order to recover the waste heat and to separate dust from flue gases. The heat content of the outcoming burnt lime is recovered in the preheaters of secondary air for the kiln.

Furthermore, cheaper solid fuels, such as bark, wood waste and peat, have been tested in heating of the lime kiln.

Direct combustion of solid fuels in lime kilns has not, however, proved to be a very successful solution because Si and Al of the fuels are taken with lime into the chemical circulation of pulp manufacturing, where they cause problems.

In accordance with the Finnish patent publication FI 72542, it is also known to gasify solid fuel with a separate gasifier or with a gasifier built in connection with the lime kiln, whereby clean gas is produced for the heating of the lime kiln. The ashes are already separated in the gasifier and are not taken into the chemical circulation.

When fuel oil is replaced by, for example, fuel gas made of bark, the bark mostly has to be dried first. This requires additional energy and separate plants. If too wet bark is gasified, the lime will not be totally calcined in the lime kiln. If bark is too wet, oil can be used as a support fuel in combustion, but energy losses will consequently increase.

In modern lime kilns, the heat is normally recovered from the process by preheating the secondary air by bringing it into contact with the outcoming lime. Air, however, causes dusting of lime mud in the kiln. Fine dust also flows outside the lime kiln and therefrom with air into the kiln again. Dust circulation is thus formed around the lime kiln, which reduces the capacity of the lime kiln.

In order to reach a more efficient heat economy, it is known, as disclosed in U.S. Pat. No. 4,626,202, to burn for example lime in a rotary kiln, in which calcination takes place in several cylindrical and parallel calcination spaces disposed around a cylindrical combustion area parallel to said spaces. This solution is, however, extremely complicated and expensive and it cannot be applied to existing lime kilns.

It is also known, as disclosed in patent publications DE 2,747,457 and FI 60609, to recover radiation heat from the shell surface of the rotary kiln with water-cooled heat recovery means. Utilization of heat has then been attempted in some other process.

The object of the present invention is to improve the heat economy of the rotary kilns without the above-mentioned drawbacks. Another object of the invention is to enable the use of a larger variety of fuels in gasification in connection with the rotary kiln.

A further object of the invention is to accomplish heat recovery means which can be applied to existing rotary kilns without great changes.

The invention is characterized in that solids are dried by simultaneously utilizing both radiation and/or convection heat of the hot jacket of the rotary kiln and heat of hot gases discharging from the hot rotary kiln. It has been calculated that losses of the radiation heat, for example in a lime kiln, are 10% of the total heat capacity.

The method of the invention can be realized with an apparatus characterized in that it comprises a rotary kiln and a jacketlike construction surrounding at least part of the jacket of the kiln, which together form a drying space provided with an inlet for wet solids and hot gases as well as an outlet for dry solids and cooled gases.

The present invention is especially suitable for drying of wet bark, sawdust, peat, wood waste or other biowaste. With the method according to the invention it is also possible to dry, for example, wet coal or sludge cakes. The method of the present invention can also be employed in drying other materials than the actual fuel. Lime mud, for example, can be dried by means of this method whereby the actual lime kiln can be shortened as heat energy is not needed for evaporation of water. Usually solid materials, which are not too wet, can be dried with the method of the present invention. The water content of the bark to be dried can be as much as 70%, but the lime mud can become too sticky when it contains less than 60% water.

As the water content of solid materials and the amount of waste heat of the rotary kiln vary, it is possible to secure steady drying with an extra combustor by means of which a sufficient amount of hot flue gases are produced in addition to the hot gases discharging from the furnace.

An embodiment of the invention is described more in detail below with reference to the accompanying drawing which is a schematic illustration of the lime mud combusting equipment.

Lime mud is fed from a conduit 2 at the upper part of the rotary kiln into the inclined rotary lime kiln 1. Gas through a duct 3 is fed into the lower part of the rotary kiln 1 from a gasifyer 4, and burned lime is removed from the kiln 1 through a lime cooler 5 in a duct 6. The rotary kiln receives combustion air from a conduit 7, and the lime cooler receives cooling air from a conduit 8. As the rotary kiln rotates, the lime mud flows from the upper section of the inclined kiln to the lower section thereof in countercurrent with the hot flue gases produced at the lower section of the kiln, whereby water evaporates and calcium carbonate burns to lime thereby forming hot flue gases. Flue gases are discharged from the kiln through a duct 9 and taken further to a gas purification means 10, e.g. a dust filter. Therefrom flue gases are conducted further through a duct 11 to a feed channel 12 through which wet bark, or other corresponding solid material, is fed with, for example, screw conveyor 13 from a tank 14 to a dryer 15 through an inlet 16. The dryer 17 itself is constructed as a jacket, which surrounds at least part of the shell surface of the rotary kiln 1. The outer shell surface 18 of the rotary kiln and the inner surface of the jacket-like construction together form a drying space 19, in one end of which is disposed an inlet 16 for wet solids and hot gases and in the other end of which is disposed an outlet 20 for the dried solids and cooled gas.

In the embodiment according to the drawing the solid material to be dried is conveyed in the parallel direction with flue gases, whereby the flue gases contribute to the conveyance of the solid material. In some other embodiments, it may be preferable to feed solid material and flue gases in countercurrent respective to each other in the drying space.

The wet solids move forward in the drying space between the shell surface and the jacket-like dryer in both axial direction and in the direction of the periphery of the kiln. The shell surface of the rotary kiln is provided with vanes 22 to regulate the movement of solid material in the desired manner and speed. The vanes can naturally be attached to the jacket of the dryer as well or to both the kiln shell surface and the dryer jacket. The vanes can be replaced by various shovels or spirals for directing the solid material in the desired direction. The rotation of the inclined kiln in itself facilitates the forward movement of the solid material in the drying space. In the embodiment according to the drawing, the jacket-like construction 17 and the shell surface 18 of the rotary kiln are integrated, whereby the dryer rotates along with the kiln. The inlets and the outlets of the drying space are sealed, which is not shown in the drawing. On the other hand, in some other applications, a solid, self-supporting, non-rotating dryer can be used, whereby inlets and outlets need not be sealed. This means that the lower section of the dryer jacket could be provided with an outlet for dry material or with a simple sluice gate, through which the drying space could be emptied quickly if needed, for example in case of overheating of the drying space.

In the embodiment according to the drawing, the material to be dried is fed through the drying space in the parallel direction with the lime mud to be dried. Solid material can also be fed in the opposite direction if required.

In accordance with the drawing, most of the dried solids are conducted through a channel 24 to a dry material tank 23 under the rotary kiln. Gases are discharged upwardly through a duct 29 into cyclone separator 25, wherefrom the purified flue gases are discharged and the solids separated therein are conducted to the tank 23. Dry solids are further taken through a conduit 26 to a gasifier, where the solids are gasified by means of air 27 entering said gasifier. Ashes and soot 28 are separated from the hot product gas, whereby impurities are prevented from entering the lime kiln and further the chemical circulation.

The temperature of flue gases entering the lime kiln in the example could be 650° to 750° C. The temperature of flue gases leaving the lime kiln could be about 300°C. Mere radiation and convection heat is insufficient for drying the necessary amount of bark in a normal lime kiln. Theoretically, radiation heat could release at most about 40% of the necessary heat energy. Thus, heat energy released by flue gases is also needed. When, for example 20% of the necessary heat is recovered in the form of radiation heat, the remaining 80% of the heat energy needed for drying is received from flue gases having a temperature of approximately 300° C. Normal retention time for solid material in a dryer could be about 20 minutes in a lime kiln application. Flow of flue gases as well as vanes or other conveyors in the drying space enable, however, the retention time and thus also the drying result to be affected. In case the radiation heat energy and the heat energy of the flue gases are not sufficient for drying the required amount of bark, flue gases can be added to the drying circulation by means of an additional combustor 30.

In some applications, conventional air-operated lime coolers can be excluded and the heat energy recovered from lime be utilized in drying bark or equivalent.

The amount of heat energy received from the rotary kiln can be affected by controlling the combustion process in the kiln, for example, by regulating the amount of air or fuel. Radiation heat can also be increased by reducing the kiln refractories in the places where heat is recovered from the shell surface. This, however, results in problems with the construction because, with conventional kilns, the extreme limit of endurance approaches at the temperature of about 400° C.

By applying the method according to the invention, it is possible in some cases to speed up the processes in rotary kilns and shorten the kilns. Because heat is recovered from the shell surface of the kiln, the construction is not susceptible to damage and higher temperatures favourable to the process can be allowed in the heart of the kiln than with ordinary processes in rotary kilns. The location of the dryer in the longitudinal direction of the kiln is dependent on the circumstances. For drying solids which are slow to dry and which require a lot of energy, the dryer can be almost as long as the kiln itself. In some applications, for example, for increasing the drying effect of an old lime kiln, it can be considered to provide only a part of the kiln with a dryer.

As mentioned earlier, the method according to the invention is suitable for drying most different wet solids, and it is not intended to be limited to the application described above, which is only a preferred application of the invention.

I claim:

1. A method of drying combustible solids with waste heat, utilizing a rotary kiln having an outer shell in which combustion takes place, comprising the steps of continuously:

(a) effecting combustion within the rotary kiln, radiation heat emanating from the outer shell of the kiln;
(b) moving combustible solids into heat exchange relationship with the outer shell of the kiln so that the solids are dried by radiation heat from the outer shell of the kiln;
(c) after exposing the solids to the radiation heat from the kiln, gasifying the solids to produce hot gases; and
(d) utilizing the hot gases from step (c) to practice step (a).

2. A method as recited in claim 1 wherein steps (b) and (c) are practiced utilizing wet waste organic material as the combustible solids.

3. A method as recited in claim 1 wherein steps (b) and (c) are practiced utilizing combustible material selected from the group consisting essentially of wet bark, sawdust, peat, and wood waste.

4. A method as recited in claim 1 wherein step (a) is practiced by combusting lime.

5. A method of drying combustible solids with waste heat, utilizing a rotary kiln having an outer shell in which combustion takes place, comprising the steps of continuously:
(a) effecting combustion within the rotary kiln, radiation heat emanating from the outer shell of the kiln;
(b) moving combustible solids into heat exchange relationship with the outer shell of the kiln so that the solids are dried by radiation heat from the outer shell of the kiln;
(c) after exposing the solids to the radiation heat from the kiln, gasifying the solids to produce hot gases;
(d) utilizing the hot gases from step (c) to practice step (a); and
(e) moving the hot gases discharged from the kiln into contact with the combustible solids in step (b) so that the combustible solids are simultaneously dried by both convective heat from the hot discharged gases, and radiation heat from the kiln outer shell.

6. A method as recited in claim 5 wherein step (e) is practiced by passing the hot discharged gases co-currently with the moving solids, and wherein radiation heat provides at least about 10% of the drying heat.

7. A method of drying combustible solids with waste heat, utilizing a rotary kiln having an outer shell in which combustion takes place, comprising the steps of continuously:
(a) effecting combustion within the rotary kiln, radiation heat emanating from the outer shell of the kiln;
(b) moving combustible solids into heat exchange relationship with the outer shell of the kiln so that the solids are dried by radiation heat from the outer shell of the kiln;
(c) after exposing the solids to the radiation heat from the kiln, gasifying the solids to produce hot gases;
(d) utilizing the hot gases from step (c) to practice step (a); and
(e) moving the hot gases discharged from the kiln into contact with the combustible solids in step (b) so that the combustible solids are simultaneously dried by both hot combustion gases from a source distinct from the kiln, as well as hot discharged gases from the kiln.

8. A method as recited in claim 5 wherein the solids are moved past the outer shell of the kiln in heat exchange relationship therewith by rotation of the kiln.

9. A method as recited in claim 5 wherein step (a) is practiced by effecting combustion of lime in the rotary kiln.

10. A method as recited in claim 9 wherein steps (b) and (c) are practiced utilizing waste organic material as the combustible solids.

11. A method as recited in claim 10 wherein an outer jacket is provided surrounding at least a part of the rotary kiln outer shell, to define a drying space between the jacket and the shell; and wherein steps (b) and (e) are practiced by moving the organic material into the drying space, and conveying the hot discharge gases from the lime kiln into the drying space.

12. A method of drying combustible solids with waste heat, utilizing a rotary kiln having an outer shell in which combustion takes place, comprising the steps of continuously:
(a) effecting combustion within the rotary kiln, radiation heat emanating from the outer shell of the kiln;
(b) moving combustible material, selected from the group consisting essentially of wet bark, sawdust, peat, and wood waste, into heat exchange relationship with the outer shell of the kiln so that the solids are dried by radiation heat from the outer shell of the kiln;
(c) after exposing the solids to the radiation heat from the kiln, gasifying the solids to produce hot gases; and
(d) utilizing the hot gases from step (c) to practice step (a);
(e) moving the hot gases discharged from the kiln into contact with the combustible solids in step (b) so that the combustible solids are simultaneously dried by both convective heat from the hot discharged gases, and radiation heat from the kiln outer shell.

13. Apparatus for drying solid material, comprising:
a rotary kiln in which combustion takes place, rotatable about and axis, and having an outer shell;
a jacket surrounding at least a part of said kiln outer shell, and defining a drying space between said jacket and said outer shell, radiation heat from said shell emanating into said drying space;
an inlet for wet solids to said drying space;
an outlet for dried solids from said drying space;
means for conveying wet solids into said drying space inlet;
a gasifier in which hot gases are produced;
means for conveying dried solids from said outlet to said gasifier; and
means for directing hot gases from said gasifier to said kiln to effect combustion in said kiln.

14. Apparatus for drying solid material, comprising:
a rotary kiln in which combustion takes place and from which hot gases are discharged rotatable about an axis, and having an outer shell;
a jacket surrounding at least a part of said kiln outer shell, an ddefining a drying space between said jacket and said outer shell, radiation heat from said shell emanating into said drying space;
an inlet for wet solids to said drying space;
an outlet for dried solids from said drying space;
mean for conveying wet solids into said drying space inlet;
a gasifier in which hot gases are produced;
means for conveying dried solids from said outlet to said gasifier;

means for directing hot gases from said gasifier to said kiln to effect combustion in said kiln; and means for directing the hot gases discharged from said kiln to said drying space.

15. Apparatus as recited in claim 14 wherein the rotary kiln comprises an inclined lime kiln including a feed conduit for lime, and an outlet duct for flue gases, both disposed at the upper end of the kiln; a duct for gases discharged from said gasifier, and discharge means for burnt lime; said duct and discharge means being disposed at the lower end of said kiln; and wherein said jacket is insulated and is disposed at approximately the middle of said lime kiln, not covering the entire outer shell thereof; and further comprising an outlet for cooled flue gases and dried solids from said drying space, said outlet for dried solids being disposed at the lower end of said drying space; a cyclone separator; and means for conveying cooled gases from said drying space outlet to said cyclone separator.

16. Apparatus as recited in claim 13 wherein said jacket is stationary, not being rotatable with said kiln.

17. A method of drying combustible solids with waste heat, utilizing a rotary kiln having an outer shell in which combustion takes place, comprising the steps of continuously:

(a) effecting combustion within the rotary kiln, radiation heat emanating from the outer shell of the kiln, and hot gases being discharged from the kiln;

(b) moving solids into heat exchange relationship with the outer shell of the kiln so that the solids are dried by radiation heat from the outer shell of the kiln; and (c) moving the hot gases discharged from the kiln into contact with the combustible solids in step (b) so that the combustible solids are simultaneous dried by both convective heat from the hot discharge gases, and radiation heat from the kiln outer shell, to produce dried solids.

18. A method as recited in claim 17 wherein step (e) is practiced by passing the hot gases co-currently with the moving solids.

19. A method as recited in claim 17 wherein step (c) is practiced with the further utilization of hot combustion gases from source distinct from the kiln, as well as the hot discharge gases from the kiln.

20. A method as recited in claim 17 wherein step (a) is practiced by combusting lime, and wherein the combustible solids are wet waste organic material.

* * * * *